Jan. 3, 1928.
P. E. BRENEMAN
TOP CONSTRUCTION
Filed Nov. 28, 1924
1,654,677
3 Sheets-Sheet 1
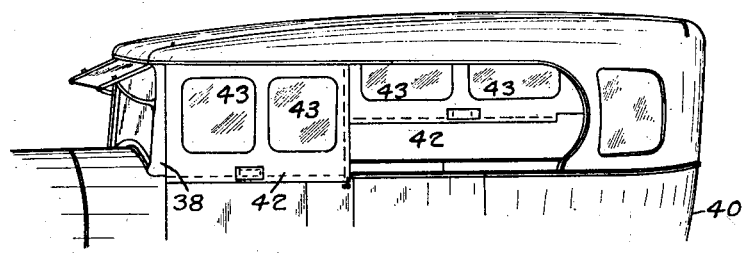
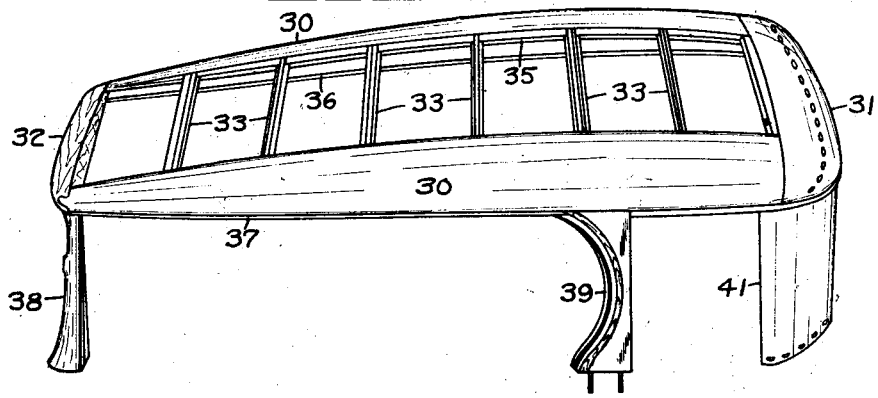
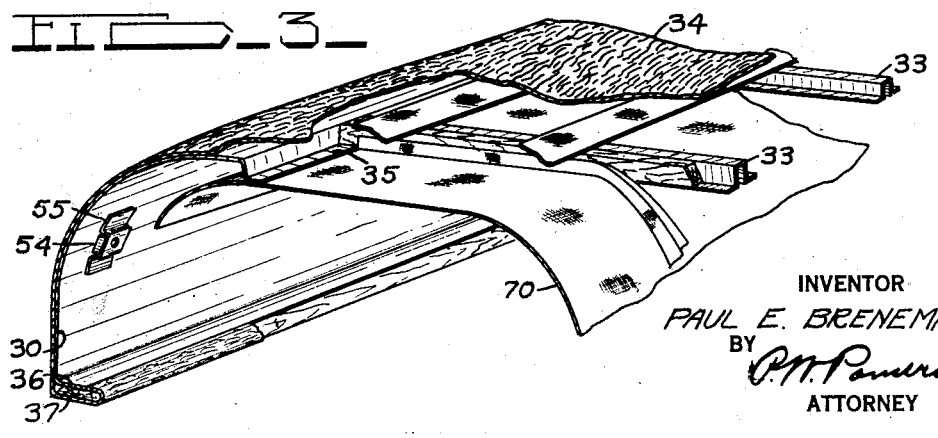
INVENTOR
PAUL E. BRENEMAN
BY
*P. M. Pomeroy*
ATTORNEY Jan. 3, 1928.
P. E. BRENEMAN
1,654,677
TOP CONSTRUCTION
Filed Nov. 28, 1924
3 Sheets-Sheet 2
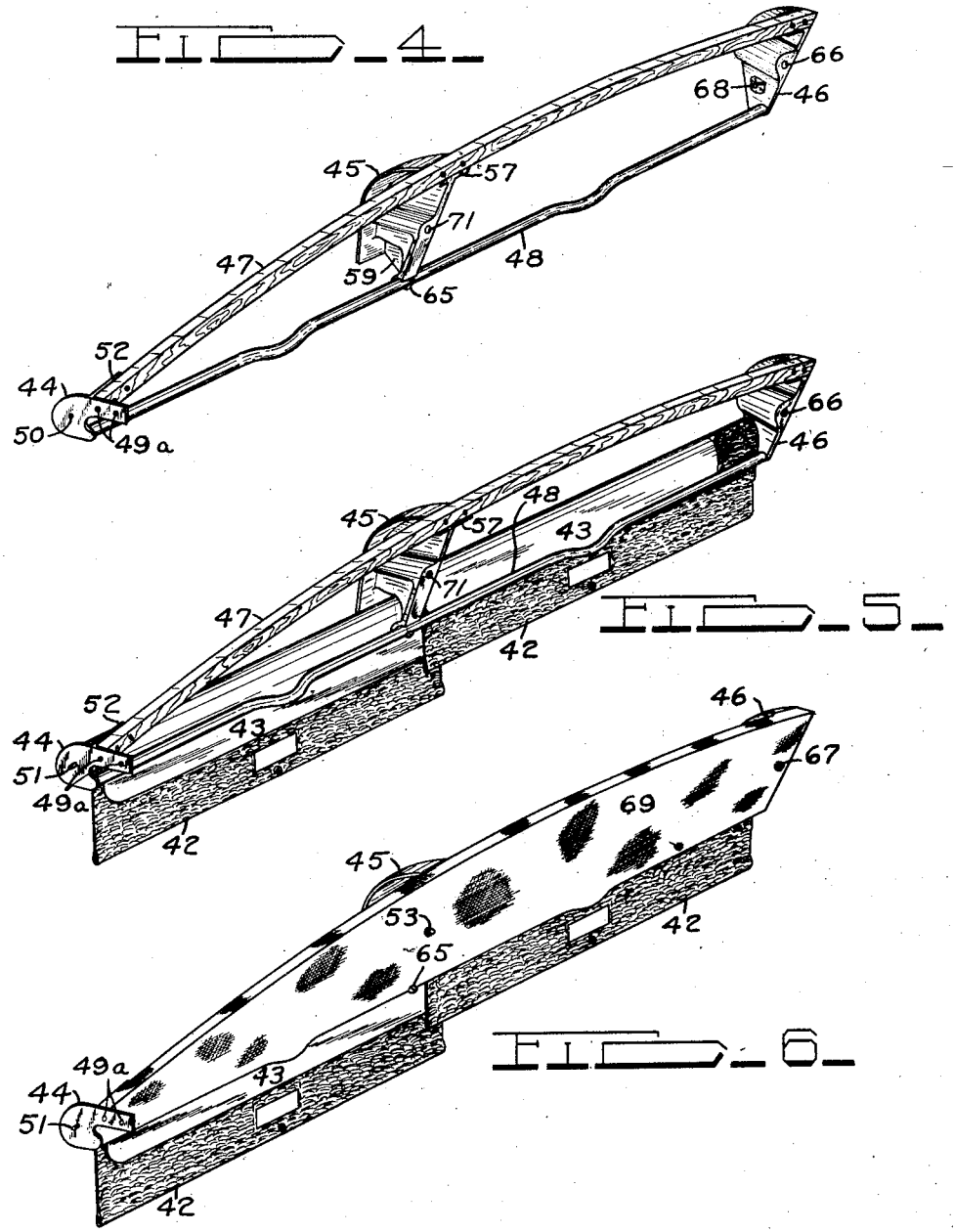
INVENTOR
PAUL E. BRENEMAN
BY
ATTORNEY

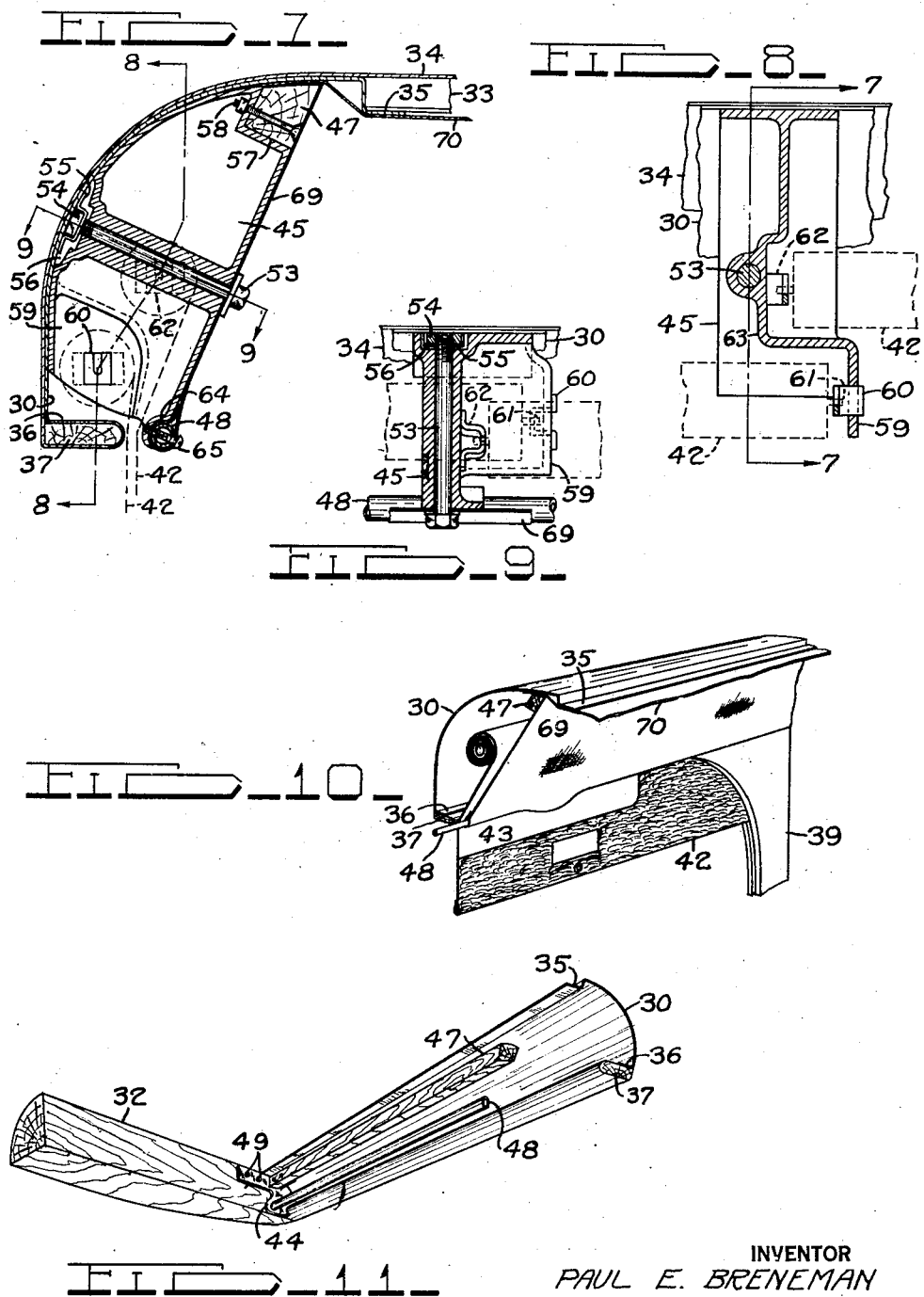

Patented Jan. 3, 1928.

1,654,677

UNITED STATES PATENT OFFICE.

PAUL E. BRENEMAN, OF DETROIT, MICHIGAN, ASSIGNOR TO THE STUDEBAKER CORPORATION, OF SOUTH BEND, INDIANA, A CORPORATION OF NEW JERSEY.

TOP CONSTRUCTION.

Application filed November 28, 1924. Serial No. 752,683.

This invention relates to motor vehicles and particularly to that type of motor vehicle known as the "open" type in which the side enclosures are usually separately attached to the vehicle body.

An object of this invention is to provide means for mounting such enclosures in the vehicle top, whereby such enclosures may be readily brought into operative position or be stowed away within the top.

Another object is to provide enclosure carrying means which may be mounted with the enclosures as a unit in a vehicle top.

Another object is to provide enclosure carrying and concealing means which with the enclosures may be easily mounted and demounted as a unit in or from a vehicle top.

Another object is to provide a frame which is securable within the quarters of a vehicle top, the frame being provided with means for carrying roller curtains in overlapped relation and being further provided with a shield for concealing the curtains when in rolled position, the frame, curtains and shield being mounted as a unit in the top.

A further object is to provide a frame-like structure having means for supporting roller curtains and a concealing shield, which construction permits a unitary bench assembly of the frame, curtains and shield, whereby said unitary assembly may be mounted in a vehicle top to provide enclosures for the open sides of the same.

The above being among the objects of the present invention, the same consists of certain features of construction and combination of parts to be hereinafter described with reference to the accompanying drawings, and then claimed, having the above and other objects in view.

In the accompanying drawings which show a suitable embodiment of the present invention, and in which like numerals refer to like parts throughout the several views, a vehicle top construction is shown which is substantially the same, as far as the construction of the top itself is concerned, as that shown and described in the co-pending U. S. Letters Patent application on top constructions, Serial Number 725,062, filed July 9, 1924, by Joseph H. Bourgon, on which the present application constitutes an improvement.

In the drawings,

Figure I is a perspective view of the finished top, the front enclosure being shown in extended position, and the rear enclosure in partially raised position.

Figure II is a perspective view of the top frame, the covering, lining and other finishing parts being omitted.

Figure III is an enlarged fragmentary perspective view showing the shape of the side quarter and the relation of the cross members thereto.

Figure IV is a perspective view of the curtain supporting frame, the curtains and rollers being omitted.

Figure V is a view similar to Figure IV showing the curtains mounted in the supporting brackets.

Figure VI is a view similar to Figure V showing the shield for concealing the curtains mounted on the frame.

Figure VII is a detailed sectional view taken on the line 7—7 of Figure VIII showing the curtain supporting frame attached to the side quarter.

Figure VIII is a sectional view taken substantially on the line 8—8 of Figure VII.

Figure IX is a sectional view taken on the line 9—9 of Figure VII.

Figure X is a fragmentary perspective view showing the curtain mounted within the side quarter and the shield enclosing the same.

Figure XI is a fragmentary perspective view showing the interior of the side quarter and front cross member with the curtain supporting frame attached thereto.

The top frame referred to comprises continuous coved sheet metal side quarters 30 and rear quarters 31, a wooden front cross member 32, and transverse ribs 33 spanning the open space between the side quarters 30. The quarters 30 and 31 extend from the lower edge of the top up and over on to the horizontal portion thereof, and act as a forming member for the top covering 34 along the curved portion and also form the sole support for the ribs 33.

The upper edges of the quarters 30 are bent downwardly and then inwardly to form a horizontally extending flange portion 35 to which are welded the outwardly extending free end portions of the inverted U-shaped ribs 33. The lower edge of the quarters 30 and 31 are also bent inwardly to form a horizontally extending flange 36 to which is secured a tacking strip 37 for the top covering 34. Suitable supports 38 and 39 are provided for supporting the top on the body 40, and a forming piece 41 is provided between the top and body 40 at the rear corners over which the covering material is secured to give the desired shape to that portion of the top.

Two roller curtains 42 having flexible transparent windows 43 are provided on each side of the vehicle for excluding the weather from the interior thereof. These curtains 42 are supported by a frame comprising a front bracket 44, center bracket 45, rear bracket 46, wooden strip 47 and rod 48. As shown in Figure 11, the bracket 44 is formed to the shape of a transverse section of the quarter 30 immediately back of the front cross member 32, and is adapted to be removably secured to the latter by means of screws 49 passing through openings 49$^a$ therein and into the front cross member 32. An opening 50 (Figure 4) is also provided therein for receiving the conventional axle pin 51 in the end of the curtain roller. The bracket 44 is also provided with a rearwardly extending flange 52 to which the wooden strip 47 is adapted to be secured when in operative position, and also receives and supports the forward end of the rod 48.

The center bracket 45 as shown comprises a casting formed to the shape of the interior of the top at a point substantially midway between the supports 38 and 39. It is provided with an opening 71 which receives a bolt 53 adapted to pass therethrough and thread into a nut 54 secured to the inner surface of the quarter 30. The nut 54 is secured by a strap 55 welded or otherwise fastened to the quarter 30 and a pocket 56 is provided in the corresponding face of the bracket 45 to allow entrance of the strap 55 and nut 54 therein so that such corresponding face may be drawn up against the inner surface of the quarter 30. The upper inner corner of the bracket 45 is formed to provide a seat 57 for the wooden strip 47 which is secured thereto by bolts such as 58 or other suitable means. A rearwardly disposed portion 59 is provided at the lower face of the bracket 45 for receiving and supporting the small U-shaped stamped metal bracket 60 which in turn receives and supports the rear curtain roller axle pin 61 of the forward curtain 42. A similar stamped curtain roller axle supporting bracket 62 is secured to a forwardly formed portion 63 (see Figure 8) of the bracket 45 for receiving and supporting the forward axle pin of the rear curtain 42. The curtains 42 are thus supported so that the rear edge of the front curtain overlaps the forward edge of the rear curtain, thereby effecting an overlapping joint between the two for excluding the weather. The lower inner corner of the bracket 45 is provided with a semi-circular seat 64 (see Figure 7) for receiving the rod 48, the latter being secured thereto by a screw 65.

The rear bracket 46 is shaped to conform to the shape of the interior of the quarter 30 at a point immediately back of the rear end of the rear curtain and is provided with an opening 66 for a bolt 67 which secures it in place in a manner similar to that by which the center bracket 45 is secured in place. It is also provided with a stamped metal U-shaped curtain roller axle pin bracket 68 of similar construction to the brackets 60 and 62 for supporting the rear end of the rear curtain, and is further provided with a seat at its upper inner corner for receiving, and to which is secured the wooden member 47 in a manner similar to that which the latter is received and secured to the center bracket 45, and means for receiving and holding the rear end of the rod 48 in a manner similar to that by which the forward end of the same is secured to the front bracket 44.

The curtain carrying frame, composed of the parts just described, may be secured in the interior of the quarter 30 with the brackets in the positions above referred to, in which position the wooden member 47 lies against the upper inner surface of the quarter 30, as shown in Figures 7 and 10, and the rod 48 lies in the same horizontal plane as, but spaced a short distance inwardly from the inner edge of the tacking strip 37, leaving a space therebetween for the passage of the curtains 42 which are guided thereby.

In order to conceal the frame and the curtains 42, when in rolled position and in place in the top, a fabric shield 69 is provided which extends between the wooden member 47 and the rod 48 as shown in Figures 6 and 10. It is held in place by means of a pocket in its lower edge formed by looping the fabric on itself and in which the rod 48 is inserted and then fastened to the brackets 44, 45 and 46, and its upper edge is brought up over and tacked to the wooden strip 47 in stretched condition. When the frame, thus having the shield 69 applied thereto and carrying the roller curtains 42 is applied to the top, the loose edge of the top lining 70 may be placed over the wooden member 47 and clamped between the same and the quarter 30 when the frame is pulled up in place by the bolts 53, 67 and screws 49, thus effecting a finished appearance to the interior of the top.

When for any reason it is necessary to repair or change of the curtains 42, it is only necessary to remove the screws 49 and bolts 53 and 67, whereupon the whole unit comprising the frame, shield 69, and curtains 42 may be removed and any part is thereupon readily accessible.

The great advantage of this construction is that the frame, which includes the curtain supporting brackets, the curtains and the shield are capable of a bench assembly as a unit and applicable to and removable from the top as a unit, thus reducing the time and labor necessary to mount the curtains in the top, which is of itself an important item where production is in progress on the assembly line system.

Another advantage is that by having a smaller unit than the whole top to handle and to work upon, it is much easier to adjust the curtains to function properly. It is to be noted that in addition to the advantages described above, the frame and brackets serve to stiffen and strengthen the top against weaving and the like.

It will be apparent without further discussion that the use of such a unitary curtain applying structure is not limited to the type of top shown and described, but may be readily adapted to any style and construction of top found desirable to use, as the present "one-man" top, and likewise it may be modified to carry any number of curtains that necessity or desire may dictate. The brackets may also readily be changed in design and material to suit a variety of different conditions, and may be positioned to support a greater number of curtains if it is found desirable to provide curtains of less width, or for use with tops on busses and the like.

Formal changes may be made in the specific embodiment of the invention described without departing from the spirit and substance of the broad invention, the scope of which is commensurate with the appended claims.

What I claim is:—

1. In combination with a vehicle top having coved side quarters and cross members connecting said side quarters, a frame for supporting roller curtains within each quarter comprising a plurality of longitudinally extending members one of which conforms to the longitudinal contour of said quarter and a plurality of transversely positioned brackets connecting said longitudinal members and conforming to the transverse contour of said quarter, means for detachably securing said brackets to said quarter, means on said brackets forming the sole supporting means for said roller curtains, means including one of said longitudinally extending members for guiding said curtains when in extended or partially extended position, and means secured to said frame and detachable therewith for concealing said curtains when in rolled position.

2. In combination with an automobile top having an inwardly extending portion adjacent its lower edge; a frame for supporting roller curtains removably secured within a quarter of said top comprising, brackets removably secured to said top, a plurality of spaced longitudinally extending members secured to said brackets, and means for supporting roller curtains on said brackets, one of said longitudinally extending members being spaced from said inwardly extending portion on said top but in adjacent relationship thereto, said inwardly extending portion and the last mentioned longitudinally extending member forming guides for said curtain passing between said inwardly extending portion and said member.

3. In combination with a top having side quarters, a frame removably secured therein comprising brackets secured directly to said top, each having one face thereof conforming to the contour of said quarter at their point of contact therewith, a plurality of spaced longitudinally extending members secured to said brackets, one of said members conforming to the longitudinal contour of said quarter, curtains supported by said brackets, and a shield extending between said members for concealing said brackets, members, and curtains.

4. In combination with a vehicle top, a frame fitting into a quarter thereof detachably secured thereto, said frame comprising brackets each having a face thereof conforming to the contour of said quarter at their point of contact and a portion extending inwardly therefrom, spaced longitudinally extending members secured to the inwardly extending portion of said brackets forming a frame for supporting a concealing shield, and supports on said brackets for mounting a curtain therebetween.

5. In combination with a vehicle top, an enclosure supporting frame comprising a plurality of longitudinally extending members connected at their ends by brackets detachably secured to said top, and another bracket secured to said members intermediate the ends thereof, the last mentioned bracket having means thereon for supporting the vehicle enclosures in overlapping position.

6. In combination with a vehicle top, an enclosure supporting frame comprising a plurality of transversely positioned brackets removably secured within a quarter thereof and extending inwardly therefrom, supporting seats formed adjacent the inner face of said brackets, spaced longitudinally extending members secured to said seats, concealing means carried by said members, roller curtain supporting means carried by said brackets, and roller curtains carried by said supporting means and concealed from view by said concealing means when in inoperative position.

7. In combination with an automobile top, a plurality of curtain supporting brackets detachably secured to said top, a plurality of longitudinally extending members secured solely to said brackets and forming therewith a detachable frame, and a concealing shield secured solely to said longitudinally extending members and detachable from said top as a unit with said members and said brackets.

8. In combination with an automobile top and a plurality of roller curtain side enclosures therefor, a plurality of brackets detachably secured within a quarter of said top, longitudinally extending members secured to said brackets and forming therewith a frame detachable as a unit from said top, and a concealing shield for said enclosures supported solely by said longitudinally extending members.

9. In combination with an automobile top and a plurality of roller curtain side enclosures therefor, a plurality of brackets detachably secured within a quarter of said top, longitudinally extending members secured to said brackets in spaced relationship and forming therewith a frame detachable as a unit from said top, means carried by said brackets for supporting said side enclosures, and a concealing shield for said enclosures supported solely by said longitudinally extending members and forming an interior finishing surface for said top.

10. In combination with an automobile top and a plurality of roller curtain side enclosures therefor, a curtain supporting frame comprising a plurality of brackets detachably secured within a quarter of said top and formed to provide stiffening means therefor, a plurality of longitudinally extending members secured in spaced relationship to the inner face of said brackets, roller curtains supported at their ends by said brackets, and a concealing shield for said curtains carried by said longitudinally extending members and removable from said top therewith, one of said longitudinally extending members forming a horizontal guide for said curtains.

11. In combination with an automobile top and a side quarter thereof, a nut secured to the inner face of said side quarter, a curtain supporting bracket provided with a face conforming in shape to said side quarter and having a recess for receiving said nut, a bolt extending through said bracket for engagement with said nut, means for supporting a roller curtain on said bracket, frame members carried by said bracket, and a shield carried by said frame members for concealing said curtain when in inoperative position, said bracket, curtain, frame members and shield being secured to said top as a unit by said bolt.

Signed by me at Detroit, Michigan, U. S. A., this 21st day of November, 1924.

PAUL E. BRENEMAN.